United States Patent [19]

Ruehle

[11] 4,209,854
[45] Jun. 24, 1980

[54] METHOD AND SYSTEM FOR ENHANCING PRIMARY SEISMIC REFLECTION SIGNALS IN COMMON DEPTH POINT SETS

[75] Inventor: William H. Ruehle, Duncanville, Tex.

[73] Assignee: Mobil Oil Corporation, New York City, N.Y.

[21] Appl. No.: 902,588

[22] Filed: May 4, 1978

[51] Int. Cl.² ............................................. G01B 1/36
[52] U.S. Cl. ...................................... 367/43; 367/50; 367/52; 367/53
[58] Field of Search ................... 340/15.5 A, 15.5 AF, 340/15.5 TC, 15.5 TD

[56] References Cited

U.S. PATENT DOCUMENTS

| | | | |
|---|---|---|---|
| 3,281,776 | 10/1966 | Ruehle | 340/15.5 GC |
| 3,550,073 | 12/1970 | Foster et al. | 340/15.5 MC |
| 3,571,788 | 3/1971 | Backus | 340/15.5 TD |
| 3,638,177 | 1/1972 | Lindblade et al. | 340/15.5 TC |
| 3,648,227 | 3/1972 | Sengbush | 340/15.5 TD |
| 3,696,331 | 10/1972 | Guinzy et al. | 340/15.5 TD |

Primary Examiner—S. C. Buczinski
Attorney, Agent, or Firm—C. A. Huggett; William J. Scherback

[57] ABSTRACT

Common depth point seismic signals from a plurality of seismic receivers are recorded on a field recorder. A first time shifter corrects the seismic signals for multiple normal moveout. A linear dip filter rejects unwanted multiple reflection signals. A second time shifter reverses the multiple normal moveout correction of the first time shifter. A third time shifter corrects the primary reflection signals for normal moveout. The primary reflection signal are then stacked and recorded as a composite common depth point seismic signal.

7 Claims, 12 Drawing Figures

METHOD AND SYSTEM FOR ENHANCING PRIMARY SEISMIC REFLECTION SIGNALS IN COMMON DEPTH POINT SETS

BACKGROUND OF THE INVENTION

This invention relates to a method and apparatus for enhancing the signal-to-noise ratio in a suite of seismic traces and more particularly to the enhancement of the primary-to-multiple reflection ratio in the seismic traces.

In seismic exploration, seismic energy is generated at a shotpoint at or near the surface of the earth, is reflected from subsurface interfaces between layers of the earth, and is received by a spread of geophones on the surface of the earth. The geophone signals are recorded in the form of a suite of seismic traces. One common method of seismic exploration is known as common depth point exploration. In this method a number of seismic traces are recorded representing seismic energy reflections from a common reflecting point.

In such common depth point exploration it is the principal object of the geophysicist to obtain an accurate representation of the subsurface layering by interpreting between the common depth point or primary reflection signals and the various noise signals that are also recorded on the seismic traces. Such noise signals may take the form of multiples, ghosts, reverberations, ground roll, shot noise, and other types of distortion. The present invention is particularly useful in common depth point seismic exploration to eliminate multiples from the seismic traces, thereby permitting more accurate interpretation of the subsurface layering.

SUMMARY OF THE INVENTION

In accordance with the present invention there is provided a method and system for enhancing resolution of primary reflection signals received during a seismic exploration operation. Seismic energy is input to the earth and the energy reflected from subsurface interfaces is recorded at points spaced along a line of exploration. The recorded seismic signals are gathered in common depth point sets and time shifted within such sets to correct for time differentials in the occurrence of selected multiple reflection signals between adjacent receiving points along the line of exploration caused by normal moveout. The signals are then filtered to reject those seismic signals not falling along a line of dip within a predetermined passband of dips. The filtered seismic signals are then time shifted to return to the time positions occupied prior to the time shifting for multiple normal moveout correction. A final time shift is carried out to correct for time differentials in the occurrence of the primary reflection signals from point to point along the line of exploration as caused by normal moveout. The seismic signals are then stacked to form a composite common depth point seismic signal having an improved primary-to-multiple reflection ratio.

DESCRIPTION OF THE PREFERRED EMBODIMENT

Figure 1:
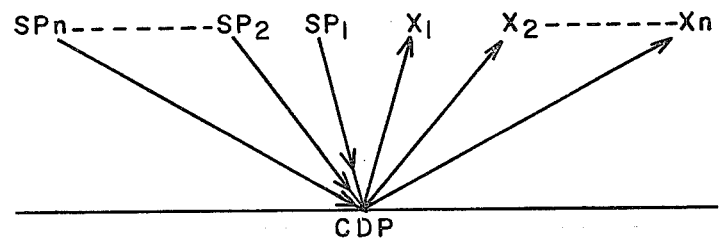
FIG. 1 illustrates a seismic exploration technique.
Figure 2:
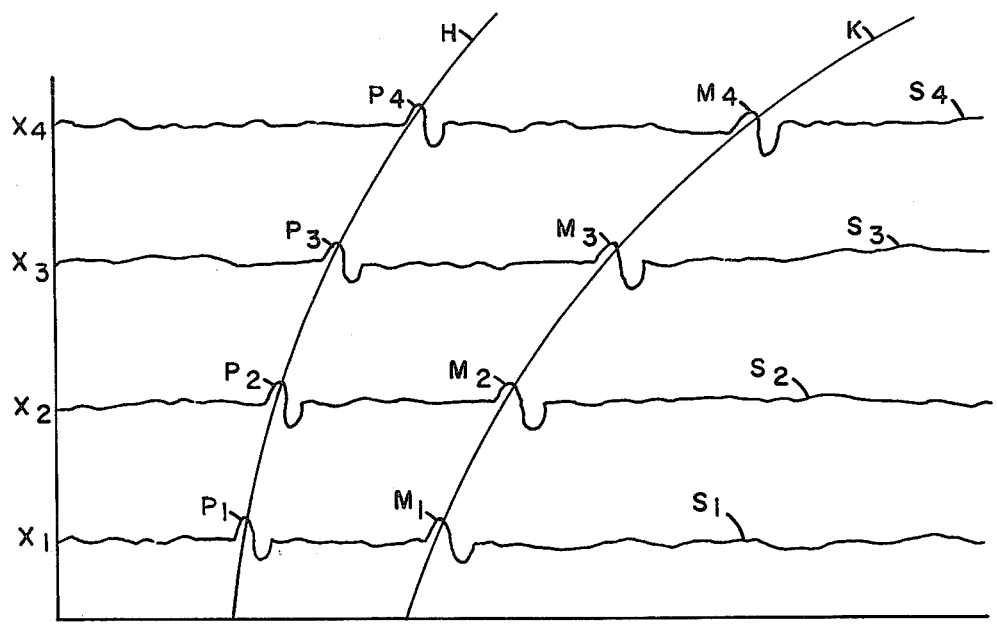
FIGS. 2 and 4 are suites of common depth point seismic traces.

Referring to FIG. 1, there is illustrated one process for obtaining a suite of seismic traces. Seismic energy, produced at each of a plurality of spaced shotpoints $SP_1-SP_n$, is reflected from a subsurface interface at a common depth point (CDP) and is received at a plurality of spaced locations $X_1-X_n$ for the production of a suite of seismograms. Such a suite of four seismic traces $S_1-S_4$ is illustrated in FIG. 2. The ordinate in FIG. 2 represents the horizontal spacing $X_1-X_4$ of the receivers which produce the seismograms $S_1-S_4$. The primary reflection signals $P_1-P_4$ and the multiple reflection signals $M_1-M_4$ received from the common depth point reflecting surface are indicated as falling along the curves H and K respectively. Curves H and K represent the arrival time from trace to trace of each of the reflection signals in the suite of seismograms. These curves are specified by the hyperbolic function:

$$T_x = \sqrt{T_o^2 + X^2/V^2} \qquad (1)$$

where, $T_x$ is the time of the reflection on a particular seismic trace;

$T_o$ is the time of that reflection on an idealized seismic trace with a reflection point directly under the shotpoint;

X is the horizontal distance between the shotpoint and the receiver producing the particular seismic trace; and V is the acoustic velocity characteristic of the layer through which the seismic energy travels.

The time shift from trace to trace of the reflections from the common depth point surface is commonly known as normal moveout and is specified by the function:

$$\Delta T = T_o - \sqrt{T_o^2 + X^2/V^2}. \qquad (2)$$

Reference is made to SEISMIC PROSPECTING FOR OIL by C. Hewitt Dix, 1952, Section 8.2.3, pp. 134–137, for a further description of normal moveout determination.

Figure 3:
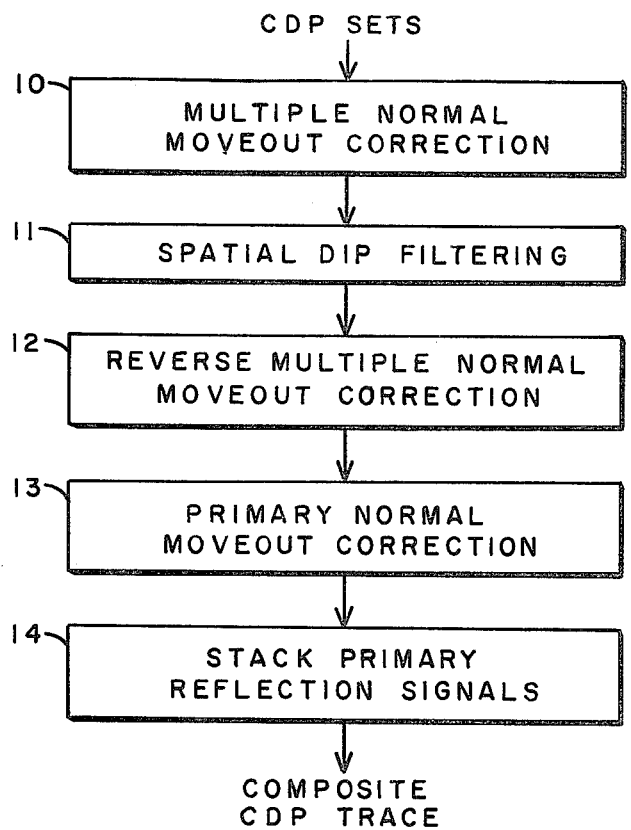
FIG. 3 is a flow sheet depicting the process of the invention.
Figure 4:
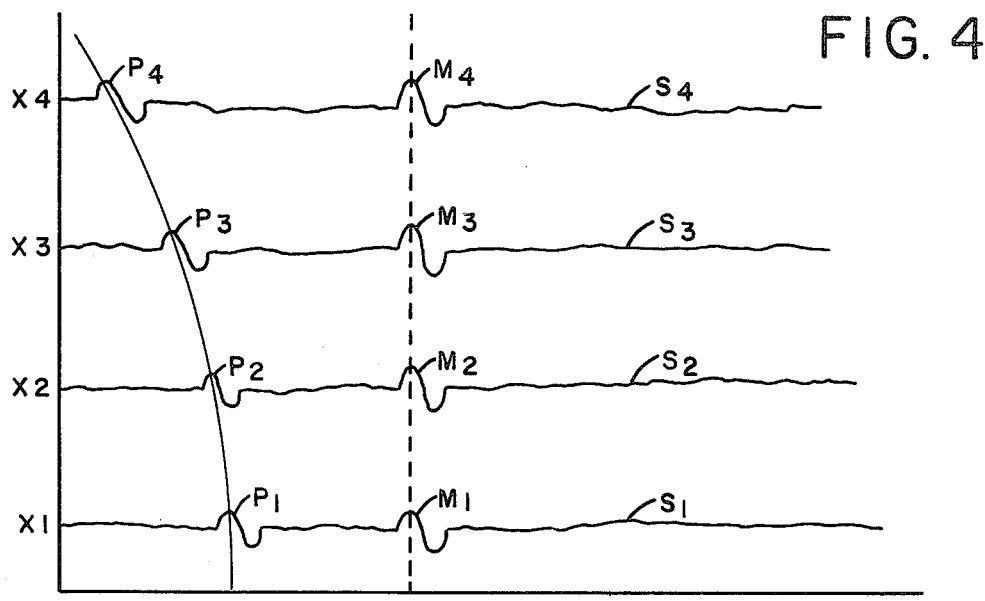

It is therefore a specific feature of the present invention to provide a technique for suppressing multiple reflection signals having differing normal moveouts from the primary reflection signals. FIG. 3 is a flow sheet of such a technique. The first step, as indicated at 10 in the flow sheet, is to carry out a normal moveout correction on the seismic traces based upon the times and velocities of the multiple reflection signals, such correction being illustrated in FIG. 4.

The next step in the process, as indicated at 11, is to carry out a spatial filtering operation on the seismic data at the particular dip of the now time-aligned multiple reflection signals.

Figure 6:
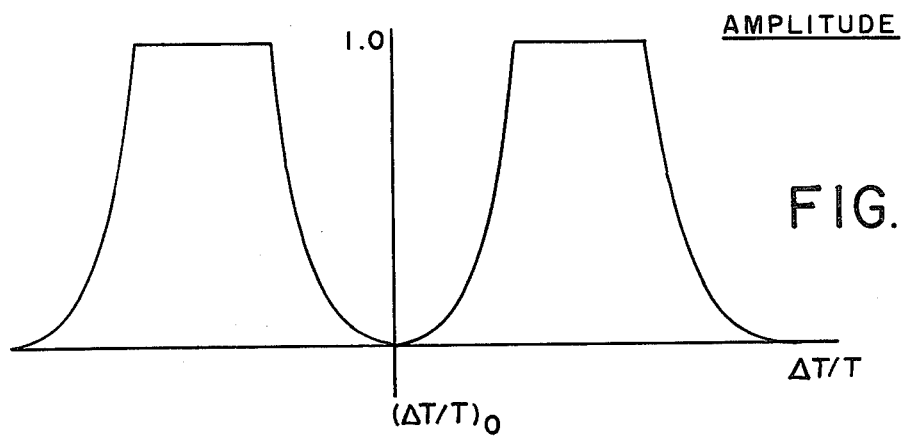
FIG. 6 illustrates amplitude characteristics of a desired filter operator for dip resolution.
Figure 7:
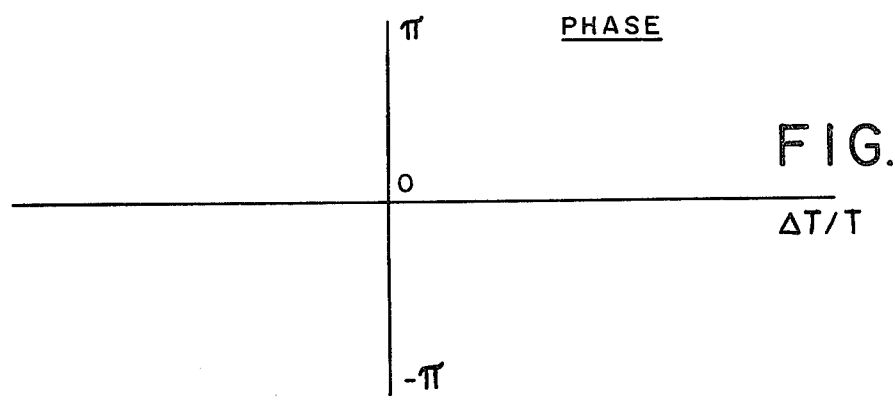
FIG. 7 illustrates phase characteristics of a desired filter operator for dip resolution.
Figure 8:
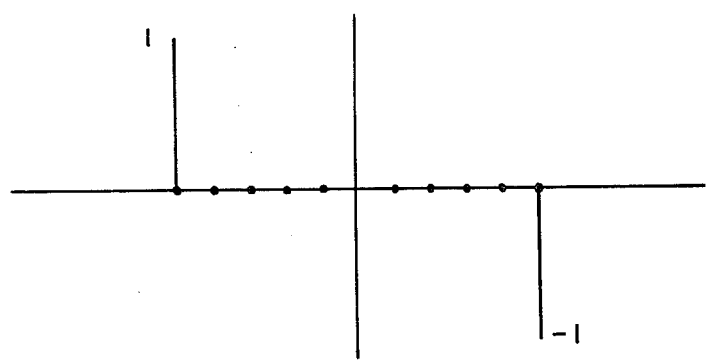
FIG. 8 illustrates the simplest form of filter based on the characteristics of FIGS. 6 and 7.
Figure 9:
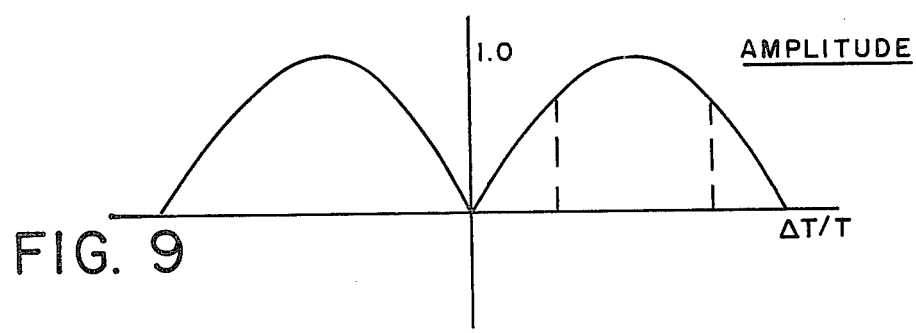
FIG. 9 illustrates the actual amplitude characteristics of the operator for the filter of FIG. 8.
Figure 10:
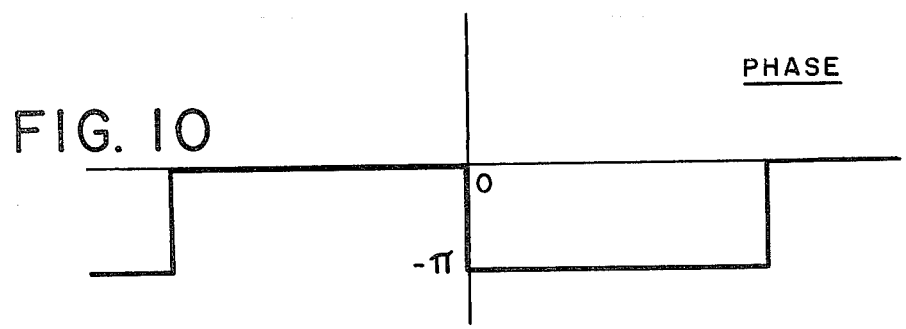
FIG. 10 illustrates the actual phase characteristics of the operator for the filter of FIG. 8.

A particularly desirable spatial response for dip resolution is shown in FIGS. 6 and 7. FIG. 6 illustrates the amplitude characteristics of the dip suppression spatial operator, while FIG. 7 illustrates the phase characteristics of such operator. The simplest filter realizing the characteristics of FIGS. 6 and 7 is given by the spatial differentiator of FIG. 8. The amplitude and phase characteristics of such a filter are illustrated in FIGS. 9 and 10, respectively. This filter has a passband between $\Delta T/T$ of 0.33 and 0.67 and has an actual zero response at zero dip.

One problem associated with the use of the spatial differential operator is in its application to reflections of opposite dips since such dips produce a phase change in the reflection waveform. This phase reversal is a result of the odd function representing the differential operation resulting in a shift of phase of $\pi$ or 180° at $\Delta T/T = 0, \pm 1, \ldots$. A study of even functions with the spectrum characteristics of FIG. 6 reveals that the function whose spectrum is $$1 - \cos(\Delta T/T)\pi \qquad (3)$$

is even, has zero response at $\Delta T/T = 0$, and a definite passband centered at $\Delta T/T = 1$.

Figure 11:
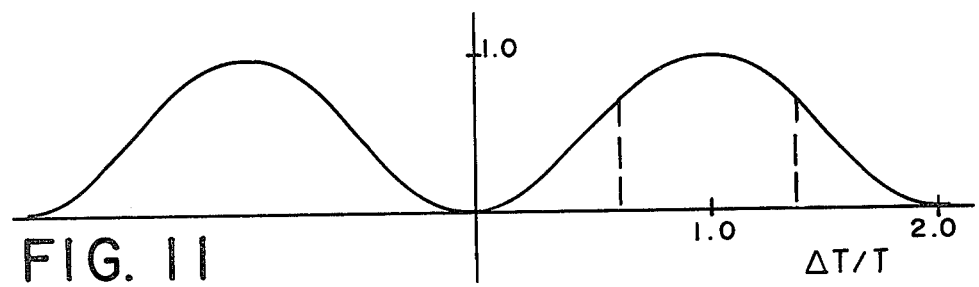
FIG. 11 illustrates the spectrum of an even function having the characteristics of FIG. 6.
Figure 12:
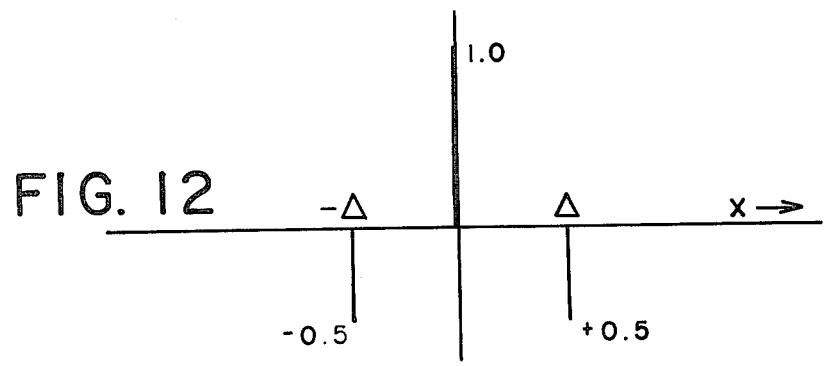
FIG. 12 illustrates the operator resulting from the transformation of the spectrum of FIG. 11 to the time domain.

The spectrum of this function is shown in FIG. 11. Comparison with FIG. 9 shows that the passband of this even function occurs for $\Delta T/T$ ratios twice that of the differentiator, thereby requiring operator lengths twice that of the differentiator. Transformation of the spectrum of FIG. 11 to the time domain gives the operator whose waveshape is shown in FIG. 12. Such operator is the result of convolving the differential operator of FIG. 8 with itself.

Having described the simplest filter realizing the desired spatial response of FIGS. 6 and 7, a general expression will now be set forth describing a class of dipping reflection filters useful in the spatial filtering of seismic data to achieve the desirable dip resolution. This class of filters can be characterized by the following:

$$\theta(j,k) = \qquad (4)$$
$$\sum_{i=1}^{NT} \sum_{n=1}^{NC} \sum_{\lambda=1}^{NF} F(\lambda) \cdot S[i + (n\delta/\Delta + 0.5) + j - 1, k - \lambda + 1]$$

where,
$\theta(j,k)$ = filtered seismic record (j,k),
$S(j,k)$ = input seismic record (j,k),
$F(\lambda)$ = filter operator,
NT = number of samples in time, i,
NC = number of traces in the record, n,
NF = number of elements in the operator, $\lambda$,
$\delta$ = dip to be suppressed in sec./trace,
$\Delta$ = sample interval,
j = sample times, and
k = traces.

A particular feature in use of the spatial filter of the present invention is that its operator is a function of the single variable $\lambda$, i.e., the number of elements to be used in the operator itself. It is this variable $\lambda$ that controls the dip bandwidth of the filter—the longer the operator, the narrower the dip range passed. This range is usually defined by the half-power points of the response curve.

Another important feature of the spatial filter is the zero response of its passband at a selected dip $\delta$ as seen in FIG. 6 for the desired spatial response and in FIGS. 9 and 11 for the simplest filter of the class.

Spatial filtering of this invention may be used on broadband data, either before or after stacking, to resolve desired reflections in the presence of strong reflections of different dips. The two- and three-point filter operators of FIGS. 8 and 11, respectively, require a well-balanced seismic section for a successful rejection of unwanted reflections of a particular dip, either primaries or multiples. Multielement operators may be used for both reduced sensitivity to record section balance and noise suppression.

The next step in the process, as indicated at 12, is to reverse the normal moveout correction of step 10 made at the multiple times and velocities. This restores the primary reflection signals $P_1$-$P_4$ of the seismic traces to the same times along the seismic traces as shown in FIG. 2. However, the multiple reflection signals of FIG. 2 are no longer present to their previous extent, having been rejected by the dip filtering of step 11.

The next step, as indicated at 13, is to carry out a normal moveout correction on the seismic traces based upon the times and velocities of the primary reflection signals $P_1$-$P_4$. This aligns the primary reflection signals to occur at the same time.

The final step, 14, can now be carried out by the stacking of the time-aligned primary reflection signals to form a signal composite CDP trace having the desired primary-to-multiple reflection ratio.

The foregoing-described process of the present invention may be machine implemented by means of conventional analog computing systems or by means of conventional digital computing systems. In a preferred mode, a digital field recorder is used to record the seismic signal outputs of the geophones, and a conventional general-purpose digital computer is utilized to carry out the process of the present invention on the digitally recorded field data. One particular computing system which is suitable for use is the Control Data Corporation Model 6600 Digital Computer, and includes the following input/output components:
Control Computer, 65 K Memory
6602 Console Display
6681 Data Channel Converter
405 Card Reader
3447 Card Reader Controller
501 Line Printer
3256 Line Printer Controller A particular plotter that is suitable for use with this preferred computing system is the Calcomp Plotter Model 763.

Figure 5:
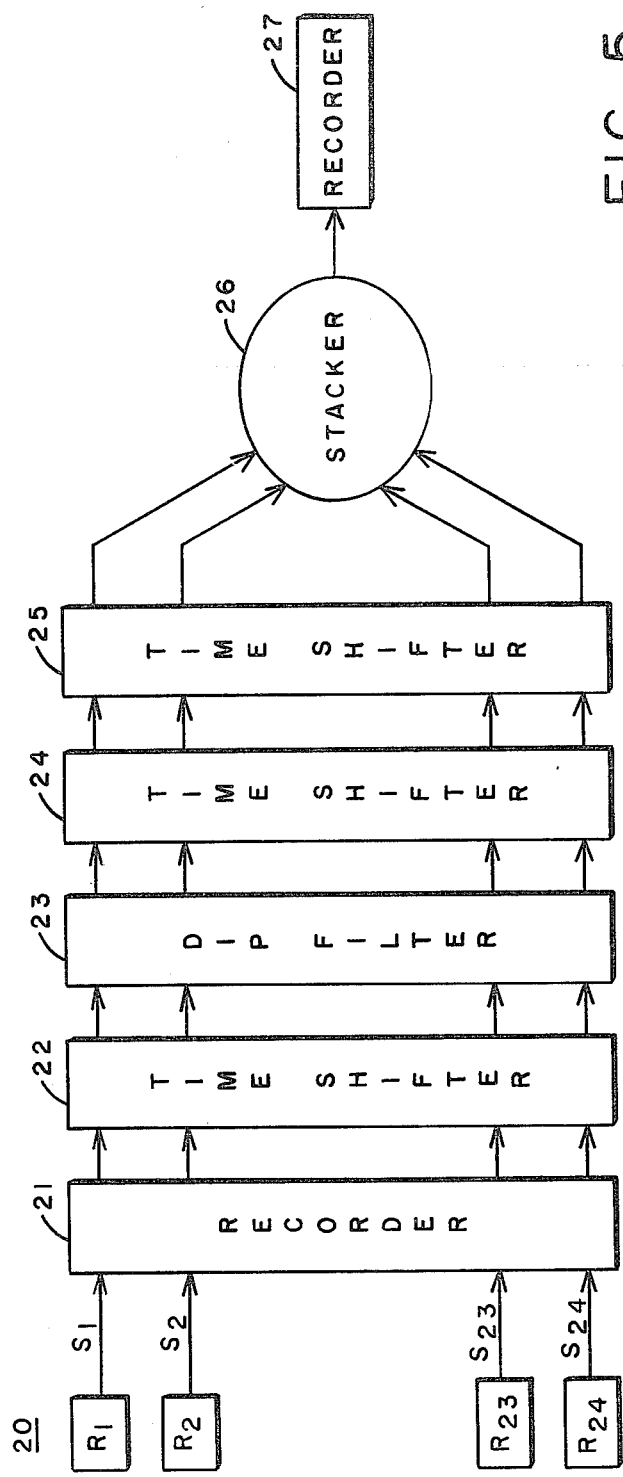
FIG. 5 illustrates apparatus for carrying out the process of the present invention.

Referring now to FIG. 5, there is illustrated an alternate embodiment of a computing system for implementing the present invention. A plurality of seismic receivers 20, twenty-four being illustrated for purposes of example, are spread along the surface of the earth or are towed through water by a marine vessel to receive seismic energy generated by at least one energy source and reflected from the subsurface layering. The signals $S_1$-$S_{24}$ from seismic receivers $R_1$-$R_{24}$ are recorded on a field recorder 21 in the form of a suite of common depth point seismic signals. These seismic signals are then applied to the computing system including units 22–27 and processed in accordance with the foregoing-described steps 10-14 of FIG. 3. A time shift unit 22 corrects each seismic signal in accordance with step 10 for the effects of the multiple reflection normal moveout in the common depth point set of seismic signals. The seismic signals are then applied to the linear dip rejection filter 23 to remove the multiple reflection signals $M_1$–$M_4$.

The seismic signals are then applied to a second time shifter 24 which reverses the normal moveout correction of the first time shifter 22 and returns the primary reflection signals to the positions which they occupied in FIG. 2.

Next, a third time shifter 25 corrects each of the primary reflection signals for normal moveout at such primary times and velocities. This aligns the primary reflection signals for stacking in the stacker 26 and recording on the output recorder 27.

Any number of conventional components and circuits may be utilized for the units 22-27 to record and process the seismic signals received at the seismic receivers 20 and recorded on recorder 21. Suitable time shifters 22, 24, and 25, stacker 26, and recorder 27 are illustrated and described in U.S. Pat. No. 3,697,939 to A. W. Musgrave.

I claim:

1. Apparatus for enhancing seismic reflection signals which have been recorded in common depth point format, comprising:
   (a) a first time shifter to which the seismic signals are applied for displacing each of said signals along the time axis to compensate for time differentials in the occurrence of multiple reflection signals between adjacent seismic signals caused by normal moveout,
   (b) a dip filter to which the seismic signals from said first time shifter are applied for rejecting those multiple reflection signals outside the dip passband of said filter,
   (c) a second time shifter to which the seismic signals from said dip filter are applied for reversing the time shifts applied to the seismic signals by said first time shifter,
   (d) a third time shifter to which the seismic signals from said second time shifter are applied for displacing each of said signals along the time axis to compensate for time differentials in the occurrence of primary reflection signals between adjacent seismic signals caused by normal moveout, and
   (e) a stacker which combines the seismic signals from said third time shifter to form a composite signal for each common depth point set of signals, such composite signal having an improved primary-to-multiple reflection signal ratio.

2. The apparatus of claim 1 wherein the passband of said dip filter has relatively zero response for reflections of selected dip.

3. The apparatus of claim 1 wherein the passband of said dip filter is controlled by the number of elements selected for use in the filter operator.

4. The apparatus of claim 1 wherein the operator for said dip filter is characterized by an even function so as to eliminate phase reversal with changes in dip direction.

5. A method of enhancing primary reflection signals recorded in the form of common depth point seismic signals, comprising:
   (a) shifting the seismic signals along their time axes to correct for normal moveout of selected multiple reflection signals,
   (b) filtering the seismic signals to enhance the resolution of reflections from preferred dipping reflections,
   (c) applying the reverse of the time shift of step (a) to the filtered seismic signals,
   (d) shifting the seismic signals along the time axis to correct for normal moveout of the primary reflection signals, and
   (e) stacking the seismic signals to produce a composite signal having improved primary-to-multiple reflection signal ratio.

6. The method of claim 5 wherein said step of dip filtering is carried out in accordance with the following:

$$\theta(j,k) = \sum_{i=1}^{NT} \sum_{n=1}^{NC} \sum_{\lambda=1}^{NF} F(\lambda) \cdot S[i + (n\delta/\Delta + 0.5) + j - 1, k - \lambda + 1]$$

where,
$\theta(j,k)$ = filtered seismic record (j,k),
$S(j,k)$ = input seismic record (j,k),
$F(\lambda)$ = filter operator,
NT = number of samples in time, i,
NC = number of traces in the record, n,
NF = number of elements in the operator, $\lambda$,
$\delta$ = dip to be suppressed in sec./trace,
$\Delta$ = sample interval,
j = sample times, and
k = traces.

7. A method of seismic exploration for the location of subsurface layers of the earth, comprising the steps of:
   (a) generating an input of seismic energy,
   (b) recording seismic signals representing said energy reflected from subsurface interfaces of the earth and received at points spaced along a line of exploration,
   (c) time shifting said received seismic signals within common depth point sets to compensate for time differentials in the occurrence of a selected multiple reflection signal between adjacent receiving points along the line of exploration caused by normal moveout,
   (d) filtering said received seismic signals to pass only those signals within a desired range of dips,
   (e) time shifting the seismic signals by the amount of the time shift of step (c), but in the opposite direction to that of step (c),
   (f) time shifting the seismic signals to compensate for the time differentials in the occurence of the primary reflection signals between adjacent receiving points along the line of exploration caused by normal moveout, and
   (g) stacking the seismic signals to produce a composite common depth point seismic signal having an enhanced resolution with respect to primary reflection signals.

* * * * *